United States Patent
Ishikawa et al.

(10) Patent No.: US 7,201,341 B2
(45) Date of Patent: Apr. 10, 2007

(54) RECORDING TAPE CARTRIDGE

(75) Inventors: Ren Ishikawa, Kanagawa (JP); Katsuki Asano, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/330,333

(22) Filed: Jan. 12, 2006

(65) Prior Publication Data

US 2006/0180693 A1    Aug. 17, 2006

(30) Foreign Application Priority Data

Jan. 28, 2005    (JP) .............................. 2005-022079

(51) Int. Cl.
*G11B 15/66* (2006.01)
(52) U.S. Cl. ................... 242/332.4; 360/132
(58) Field of Classification Search ............ 242/332.4, 242/348, 348.2; 360/132
See application file for complete search history.

(56) References Cited

U.S. PATENT DOCUMENTS

| | | | |
|---|---|---|---|
| 6,236,539 B1* | 5/2001 | Morita et al. ............... | 360/132 |
| 6,663,036 B1* | 12/2003 | Ishihara et al. .......... | 242/348.2 |
| 6,691,941 B2* | 2/2004 | Imai ........................ | 242/332.4 |
| 6,698,676 B2* | 3/2004 | Shiga et al. ............. | 242/348.2 |
| 6,840,472 B2* | 1/2005 | Ishihara et al. .......... | 242/332.4 |
| 2002/0079396 A1* | 6/2002 | Ridl et al. ................ | 242/348.2 |
| 2003/0189120 A1* | 10/2003 | Aaron et al. ............. | 242/348.2 |
| 2004/0011909 A1* | 1/2004 | Ishihara .................... | 242/348.2 |
| 2004/0026553 A1* | 2/2004 | Ishihara et al. .......... | 242/348.2 |
| 2005/0006515 A1* | 1/2005 | Sasaki et al. ............. | 242/348.2 |
| 2005/0139709 A1* | 6/2005 | Shiga et al. ............. | 242/348.2 |

FOREIGN PATENT DOCUMENTS

| JP | A 2004-47057 | 2/2004 |
|---|---|---|
| JP | A 2004-348863 | 12/2004 |

\* cited by examiner

*Primary Examiner*—William A. Rivera
(74) *Attorney, Agent, or Firm*—Margaret A. Burke; Sheldon J. Moss

(57) ABSTRACT

Retention portions that retain a leader member of recording tape are formed inside a case, and a spring member pushes the leader member toward the retention portions. The spring member contacts support point members, and the support point members serve as support points when the spring member deforms. The support point members, which are disposed such that they protrude from side walls of the case, include a height D1 from an inner surface (attachment reference surface) of the side walls. The spring member is bent such that its height at positions contacting the support point members from the attachment reference surface includes a height D2 in a state where the spring member is not attached to the case. Here, $D2 \leq D1$. When the spring member is attached to the case, the spring member always contacts the support point members. Thus, the pushing force of the spring member is stable.

12 Claims, 6 Drawing Sheets

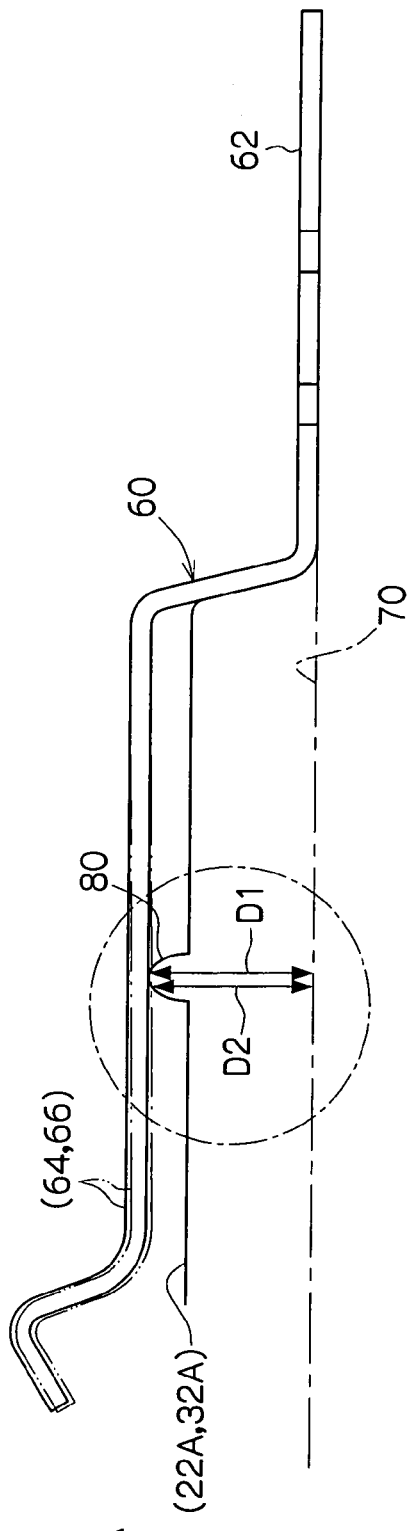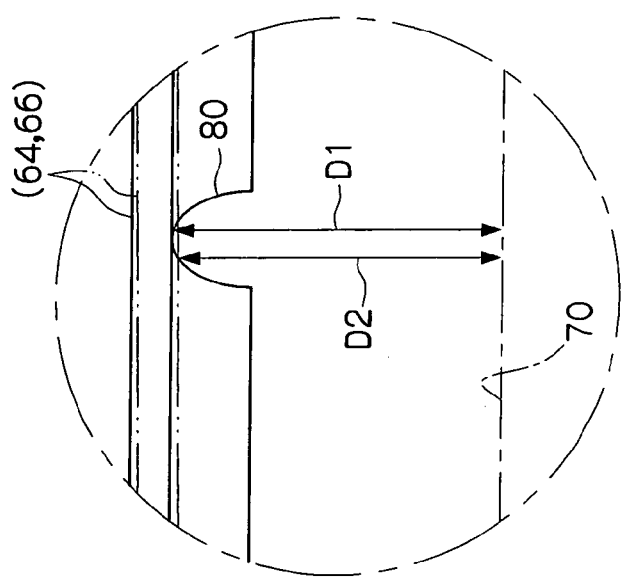
FIG.5A
FIG.5B

RECORDING TAPE CARTRIDGE

CROSS-REFERENCE TO RELATED APPLICATIONS

This application claims priority under 35 USC 119 from Japanese Patent Application No. 2005-22079, the disclosure of which is incorporated by reference herein.

BACKGROUND OF THE INVENTION

1. Field of the Invention

The present invention relates to a recording tape cartridge, and more particularly to a recording tape cartridge including a case that houses a single reel onto which is wound recording tape such as magnetic tape mainly used as a recording and playback medium for computers and the like.

2. Description of the Related Art

Conventionally, magnetic tape cartridges have been known which include a case that houses a single reel onto which is wound magnetic tape used as a data recording and playback medium for computers and the like. A leader member, such as a leader block, a leader pin, or a leader tape, is disposed on a leading end of the magnetic tape. A pullout mechanism disposed in a drive device pulls out the leader member from the magnetic tape cartridge, and the magnetic tape fixed to the leader member is wound onto a take-up reel of the drive device.

Japanese Patent Application Publication (JP-A) No. 2004-348863 discloses a recording tape cartridge that includes a plate spring (lock spring) that holds both end portions of the leader pin. Because both end portions of the leader pin are held by the plate spring, the leader pin is prevented from coming out even if a collision acts on the recording tape cartridge, such as a collision resulting from the recording tape cartridge being inadvertently dropped. JP-A No. 2004-47057 discloses a recording tape cartridge where a support point protrusion serving as a support point when the lock spring flexes is disposed inside the case, so that the pressing force of the lock spring is stabilized by the support point protrusion.

However, because the lock spring is formed by bending a metal plate or a metal rod, sometimes, due to variations or the like in the bending precision, the lock spring does not contact the support point protrusion when the lock spring is attached to the case. That is, there are variations in the pressing force of the lock spring—that is, the pullout resistance force of the leader pin—between when the lock spring contacts the support point protrusion and when the lock spring does not contact the support point protrusion.

When, for example, the machining precision of the lock spring is raised in order to eliminate this drawback, there is the potential for the machining range to become narrow and for the cost to increase. Also, when the support point protrusion is eliminated and the lock spring itself is made compact, it becomes difficult to attach the lock spring to the case.

SUMMARY OF THE INVENTION

In view of these circumstances, the present invention provides a recording tape cartridge which can stabilize the pullout resistance force of the leader member with a configuration whose cost is low and whose assembly is easy.

A first aspect of the invention provides a recording tape cartridge comprising: a case that rotatably houses a single reel onto which recording tape is wound; a leader member that is attached to an end portion of the recording tape and is pulled out by a pullout mechanism of a drive device; a spring member including an attachment portion that is attached to the case and pullout resistance force action portions that impart pullout resistance force to the leader member as a result of bending deformation; and support point members that contact the spring member between the attachment portion and the pullout resistance force action portions, wherein when D1 represents the height of the support point members measured from an attachment reference surface where the spring member is attached to the case, and D2 represents the height of the spring member in a natural state at the portions where the spring member contacts the support point members, the spring member is bent such that $D2 \leq D1$.

Consequently, when the spring member is attached to the case, the spring member always contacts the support point members, regardless of machining variations, due to the relationship of $D2 \leq D1$. Because the support points at the time of bending deformation of the spring member are determined to be the positions of the support point members (i.e., because the support points do not change), the spring force acting on the leader member from the spring member is stable, and the pullout resistance force of the leader member is also stable with few variations.

Moreover, because it is acceptable if there are machining variations in the spring member, the cost of the spring member is low. The spring member can also be easily attached to the case because it is not necessary to make the spring member itself compact.

When the leader member is pulled out from the case counter to the pullout resistance force of the leader member, the recording tape is sequentially wound off from inside the case.

In the above aspect of the invention, the spring member may be made of metal.

When the spring member is made of metal, molding and machining become easy.

In the above aspect of the invention, the support point members may be molded integrally with the case.

Consequently, the number of parts becomes fewer in comparison to a configuration where the support point members are separate from the case. Variations in the positions of the support point members are also eliminated.

Because the invention is configured as described above, the pullout resistance force of the leader member can be stabilized with a configuration whose cost is low and whose assembly is easy.

A second aspect of the invention provides a recording tape cartridge comprising: recording tape that includes an end portion to which a leader member is attached, with the recording tape being pulled out as a result of a pullout mechanism of a drive device engaging with the leader member; a case that rotatably houses a single reel onto which the recording tape is wound; retention portions that are formed inside the case and retain the leader member when the recording tape is housed inside the case with the leader member; a spring member that is disposed inside the case and includes an attachment portion attached to an attachment surface formed in the case and pullout resistance force action portions that elastically deform when the leader member engaged by the pullout mechanism is pulled out from the retention portions and cause resistance force to act on the pulling out of the leader member; and support point members that contact the spring member at contact portions between the attachment portion and the pullout resistance force action portions and offer support points for the deformation of the spring member, wherein the spring member includes bent portions between the contact portions and the attachment portion, and when D1 represents the height of the support point members measured from the attachment surface of the case, and D2 represents the height of the spring member at the portions where the spring member contacts the support point members in a state where the spring member has not been attached to the case, $D2 \leq D1$.

A third aspect of the invention provides a recording tape cartridge comprising: recording tape that includes an end portion to which a leader member is attached, with the recording tape being pulled out as a result of a pullout mechanism of a drive device engaging with the leader member; a case that rotatably houses a single reel onto which the recording tape is wound; retention portions that are formed inside the case and retain the leader member when the recording tape is housed inside the case with the leader member; a spring member that is disposed inside the case and includes an attachment portion that is attached to the case and pullout resistance force action portions that elastically deform when the leader member engaged by the pullout mechanism is pulled out from the retention portions and cause resistance force to act on the pulling out of the leader member; and support point members that contact the spring member in a state where the leader member is housed in the retention portions and offer support points for the deformation of the spring member.

BRIEF DESCRIPTION OF THE DRAWINGS

FIG. 5A is a plan view showing the height relationship between the plate spring and the plate spring attachment portion in the recording tape cartridge pertaining to the embodiment of the invention, and FIG. 5B is an enlarged view of the relevant portions of FIG. 5A.

DETAILED DESCRIPTION OF THE INVENTION

Figure 1:
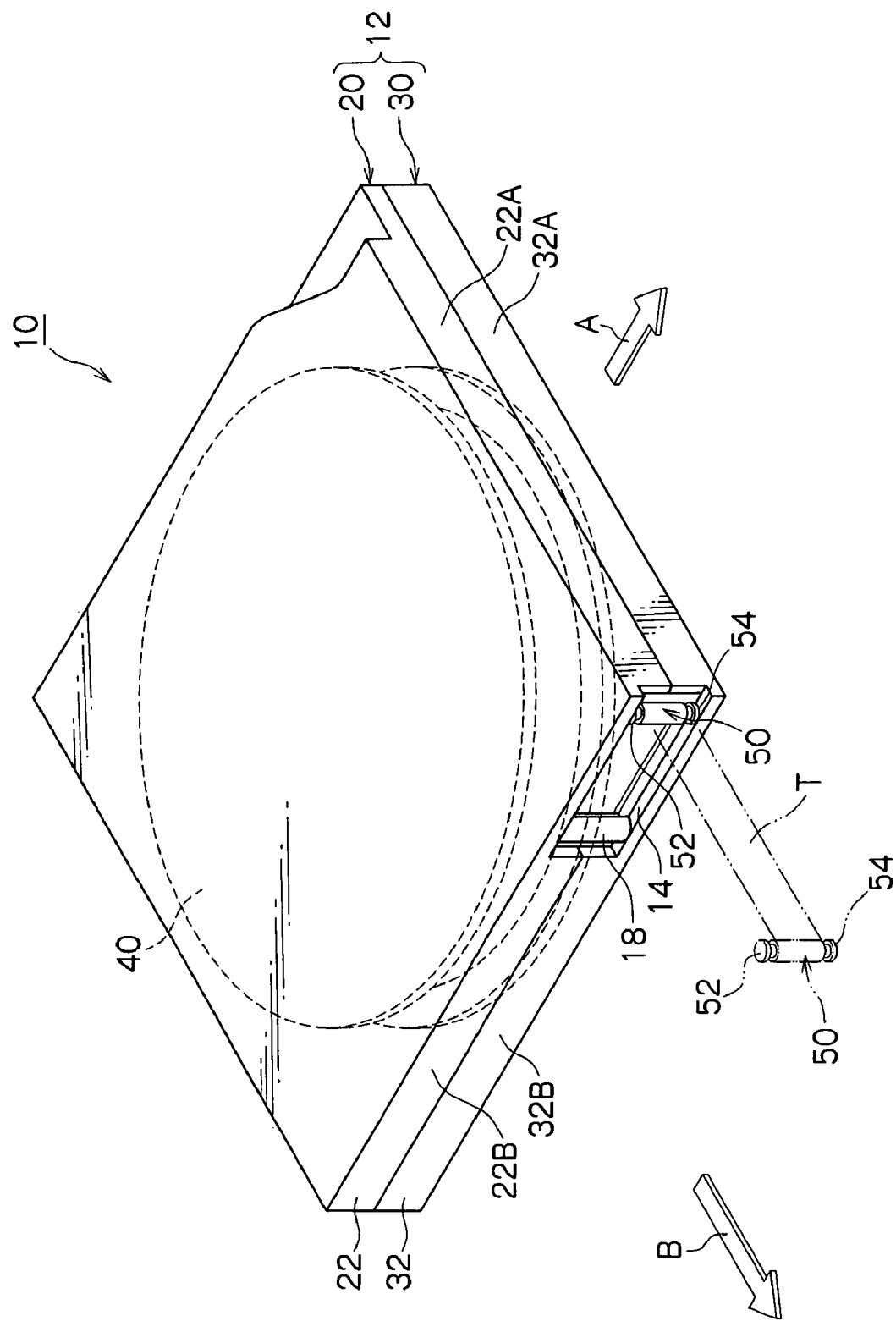
FIG. 1 is a perspective view schematically showing a recording tape cartridge pertaining to the embodiment of the invention.

A recording tape cartridge pertaining to an embodiment of the invention will be described in detail below on the basis of an example shown in the drawings. For convenience of explanation, the direction in which the recording tape cartridge is loaded into a drive device will be represented by arrow A shown in FIGS. 1 and 2 and referred to as the front direction of the recording tape cartridge. The right direction of the recording tape cartridge will be represented by arrow B shown in the same figures. Also, magnetic tape T will be used as the recording tape, and a magnetic tape cartridge 10 will serve as the recording tape cartridge.

Figure 2:
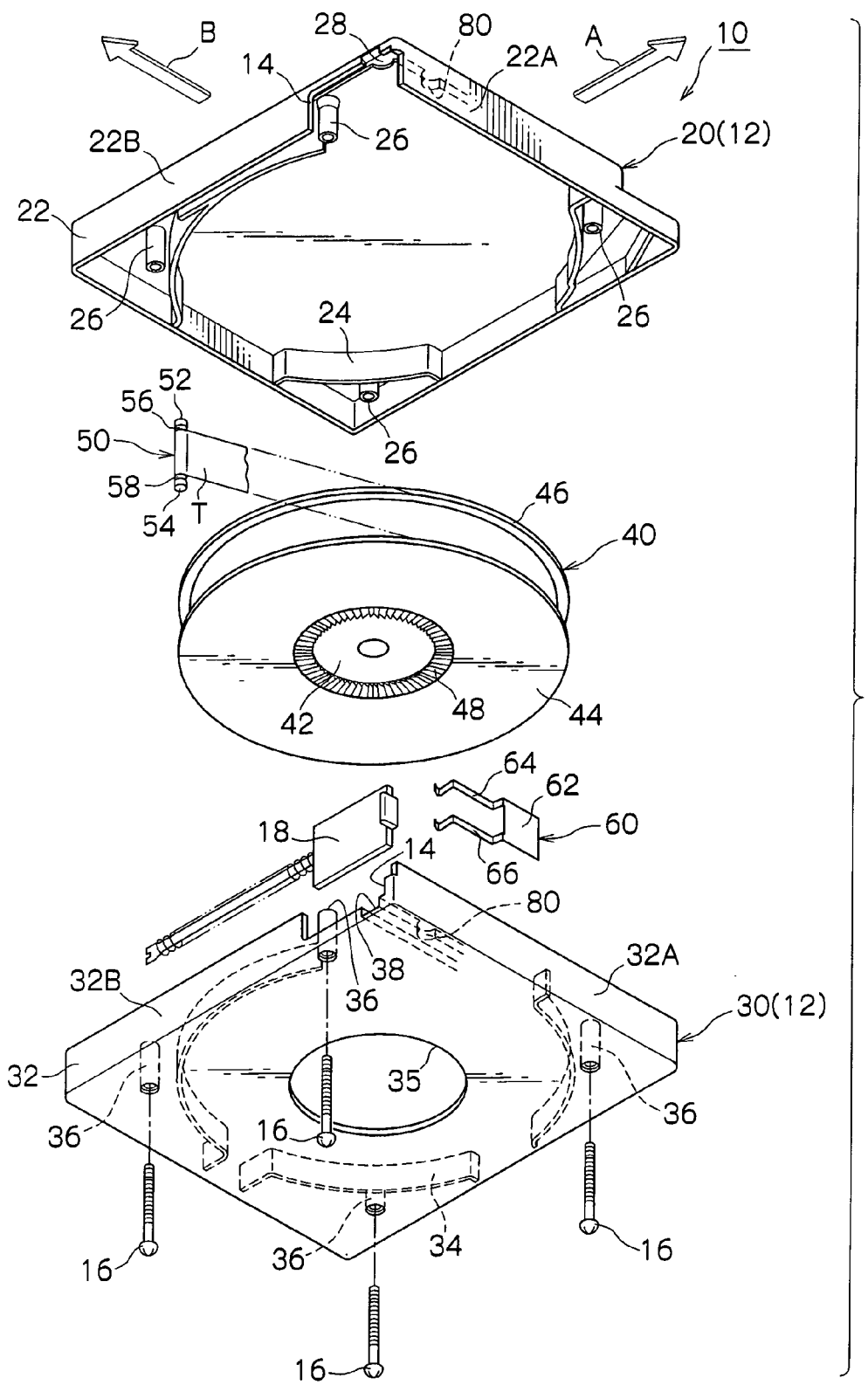
FIG. 2 is an exploded perspective view schematically showing the recording tape cartridge pertaining to the embodiment of the invention.

As shown in FIGS. 1 and 2, the magnetic tape cartridge 10 includes a case 12 made of synthetic resin. The case 12 comprises an upper case 20, which includes a peripheral wall 22, and a lower case 30, which includes a peripheral wall 32. The case 12 is formed in a substantially rectangular box-like shape by joining together the upper case 20 and the lower case 30 in a state where the peripheral wall 22 and the peripheral wall 32 have been brought into contact with each other.

Plural (four in the drawings) non-through bosses 26 are disposed on, and protrude from, the inner surface of the upper case 20. The same number of through bosses 36 are disposed on, and protrude from, the inner surface of the lower case 30. When the peripheral wall 22 of the upper case 20 and the peripheral wall 32 of the lower case 30 are brought into contact with each other, the bosses 26 and 36 contact each other such that they are communicated. Consequently, the upper case 20 and the lower case 30 are joined together by screwing screws 16 into the bosses 26 via the bosses 36 from the undersurface of the lower case 30.

A single reel 40 is rotatably-housed inside the case 12, and the magnetic tape T serving as an information recording and playback medium is wound onto the reel 40. Free regulation walls 24 and 34 are vertically disposed on the inner surfaces of the upper case 20 and the lower case 30. The free regulation walls 24 and 34 respectively form a substantially cylindrical shape and are substantially vertically symmetrical. A circular gear opening 35 is disposed in the center of the lower case 30. A reel gear 48 annularly disposed on the undersurface of the reel 40 is exposed through the gear opening 35.

The reel 40 includes a substantially cylindrical reel hub 42, a lower flange portion 44, and an upper flange portion 46. The lower flange portion 44 protrudes in the radial direction from the outer periphery of the lower end of the reel hub 42, and the reel hub 42 and the lower flange portion 44 are integrally molded using synthetic resin. The upper flange portion 46 has the same shape as that of the lower flange portion 44, and the upper flange portion 46 is joined to the upper end of the reel hub 42 by ultrasonic welding or the like. The magnetic tape T is wound onto the reel hub 42.

Figure 3:
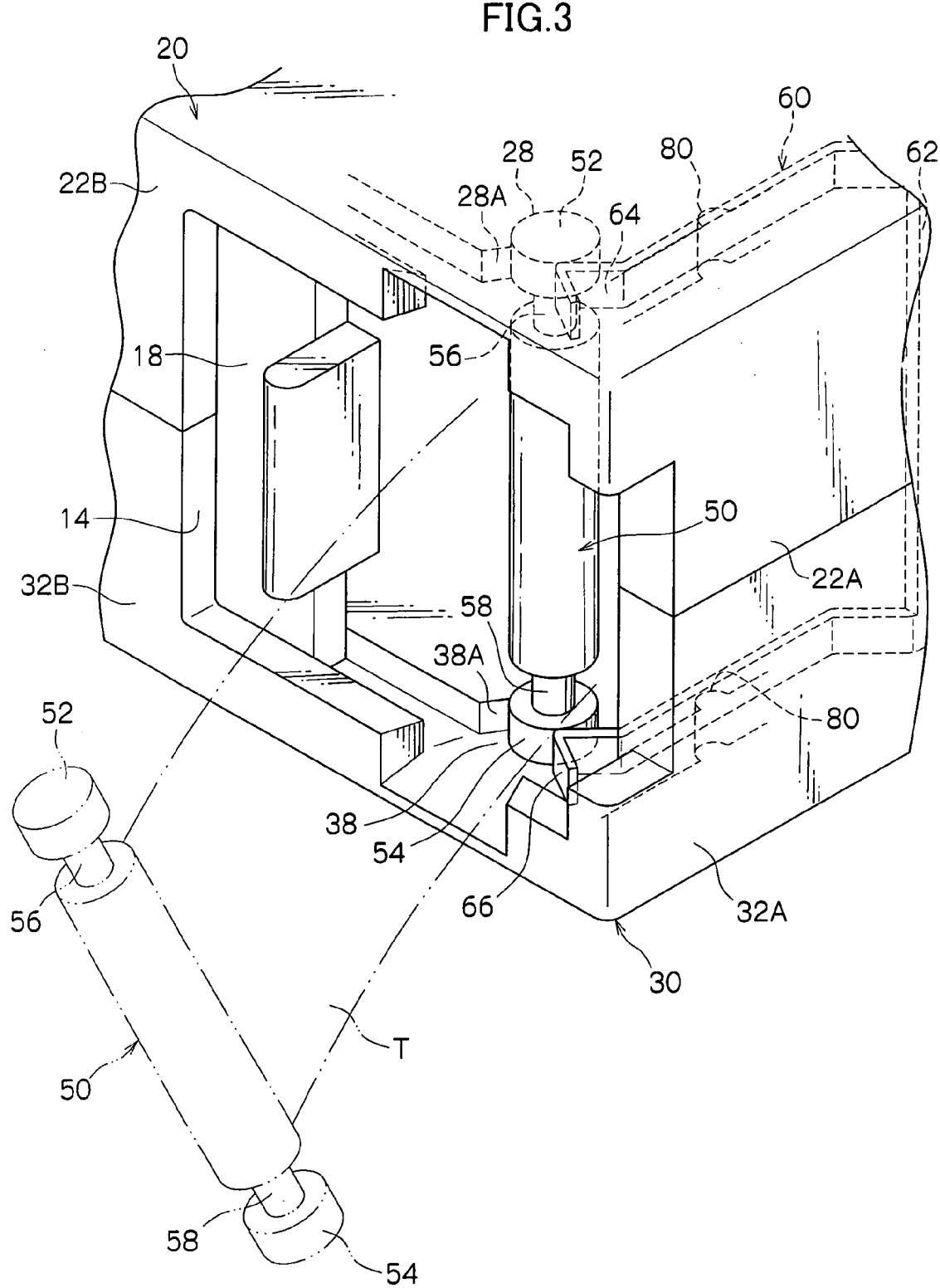
FIG. 3 is a perspective view showing the vicinity of an opening in the recording tape cartridge pertaining to the embodiment of the invention.

As shown in FIG. 3, an opening 14 is formed in the vicinity of the front right corner portion of the magnetic tape cartridge 10 by cutting out side walls 22B and 32B. The opening 14 is for pulling out the magnetic tape T wound onto the reel 40. When the magnetic tape cartridge 10 is not in use, the opening 14 is closed off by a shutter member 18 that moves along the inner sides of the side walls 22B and 32B.

Recessed portions (retention portions) 28 and 38 are disposed in the inner surfaces of the upper case 20 and the lower case 30 in the vicinity of the corner portion (the opening 14). The recessed portions 28 and 38 are substantially U-shaped when seen in plan view and respectively lock an upper end portion 52 and a lower end portion 54 of a leader pin 50. A pullout mechanism (not shown) of the drive device engages with the leader pin 50 in order to pull out the magnetic tape T. Annular grooves 56 and 58, with which the pullout mechanism engages, are formed in the leader pin 50 between the upper end portion 52 and the lower end portion 54 and the portion of the leader pin 50 to which the magnetic tape T is fixed.

As shown in FIGS. 2 and 3, the magnetic tape cartridge 10 also includes a plate spring 60. The plate spring 60 is an elastically deformable spring member that urges the upper end portion 52 and the lower end portion 54 of the leader pin 50 toward arced wall surfaces (recessed surfaces) 28A and 38A of the recessed portions 28 and 38 with a predetermined pressure, such that the upper end portion 52 and the lower end portion 54 do not come out of the recessed portions (retention portions) 28 and 38.

The plate spring 60 is configured by a planar body portion 62, which is locked to and retained at the inner side of side walls 22A and 32A, and slender action portions 64 and 66, which integrally extend a predetermined length toward the opening 14 from both the upper and lower end portions of the body portion 62. The leading ends of the action portions 64 and 66 are bent inward (rearward) in substantial V-shapes when seen in plan view and configured to respectively contact the upper end portion 52 and the lower end portion 54 of the leader pin 50.

That is, the action portions 64 and 66 of the plate spring 60 respectively push (urge) the upper end portion 52 and the lower end portion 54 of the leader pin 50 with a predetermined pressure toward the arced wall surfaces 28A and 38A, whereby the leader pin 50 is retained such that it does not come out of the recessed portions 28 and 38. When the leader pin 50 is to be pulled out from, or locked in, the recessed portions 28 and 38, the action portions 64 and 66 appropriately elastically deform to allow the leader pin 50 to move. Consequently, the pushing force (pullout resistance force) of the plate spring 60 is set such that it does not exceed the pullout force of the pullout mechanism. In other words, the upper limit of the pushing force (pullout resistance force) of the plate spring 60 is set such that it is substantially equal to the pullout force of the pullout mechanism.

Consequently, as will be understood from the above, the body portion 62 corresponds to the "portion (of the spring member) that is attached to the case" of the invention, and the leading ends of the action portions 64 and 66 correspond to the "pullout resistance force action portions" of the invention. Also, the inner surface of the side walls 22A and 32A serves as an attachment reference surface 70.

Figure 4:
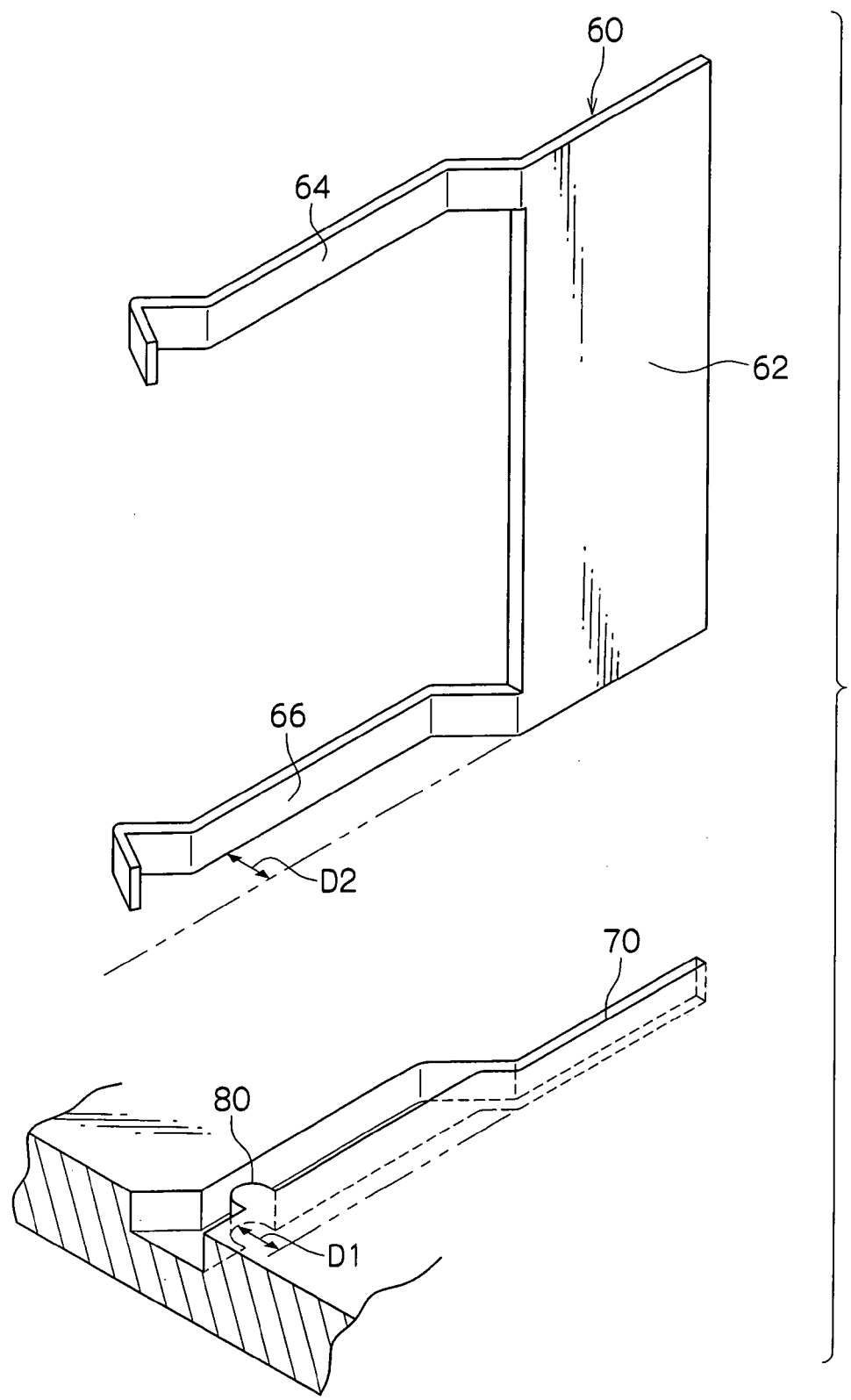
FIG. 4 is an exploded perspective view showing a plate spring and a plate spring attachment portion in the recording tape cartridge pertaining to the embodiment of the invention.

As shown in FIG. 4 and FIGS. 5A and 5B, support point members 80 are disposed on, and protrude from, the side walls 22A and 32A such that the support point members 80 are positioned between the body portion 62 and the leading ends of the action portions 64 and 66. The shape of each support point member 80 is determined such that it has a predetermined height D1 measured from the inner surface (attachment reference surface 70) of the side walls 22A and 32A.

The plate spring 60 is bent such that its height at the same position as the support point members 80 measured from the attachment reference surface 70 in a natural state (i.e., assuming that the plate spring 60 has not been attached to the case 12) has a predetermined height D2. The height D2 is determined in advance such that the relationship of D2≦D1 is established with D1.

Consequently, when the plate spring 60 is actually attached to the case 12, the plate spring 60 always contacts the support point members 80 due to the aforementioned relationship. Additionally, the portions where the action portions 64 and 66 contact the support point members 80 serve as support points for the elastic deformation of the action portions 64 and 66. Consequently, as long as the above-described condition is satisfied, the portions where the action portions 64 and 66 contact the support point members 80 serve as support points for the elastic deformation of the action portions 64 and 66 even if there are variations in the machining of the plate spring 60. Thus, the plate spring 60 can exhibit a stable (i.e., having few variations) spring force, and the pushing force (pullout resistance force) of the plate spring 60 is also stable.

In particular, there are also instances where the variations in the machining of the plate spring 60 are large, and if support point members are formed such that the above-described relationship is not satisfied (D2>D1), the pushing force (pullout resistance force) of the plate spring 60 improperly changes.

This point will be described with reference to FIG. 6, which shows deformation resulting from variations in the bending of the plate spring 60. The horizontal axis represents the position of the plate spring 60 in the longitudinal direction (the direction of arrow B in FIG. 1), and the vertical axis represents the position of the plate spring 60 in the deformation direction (the direction of arrow A in FIG. 1). As indicated by the solid line L1 in FIG. 6, at the initial stage of deformation of the action portions 64 and 66, the entirety of each of the actions portions 64 and 66 acts as a spring because the action portions 64 and 66 do not contact the support point members 80 (indicated by an arrow in FIG. 6, because the focus is on the support point members 80). The support points for the deformation in this instance are at the boundary portions between the body portion 62 and the action portions 64 and 66. Because the substantial spring length becomes longer, the spring constant drops and the pushing force (pullout resistance force) also drops.

Figure 6:
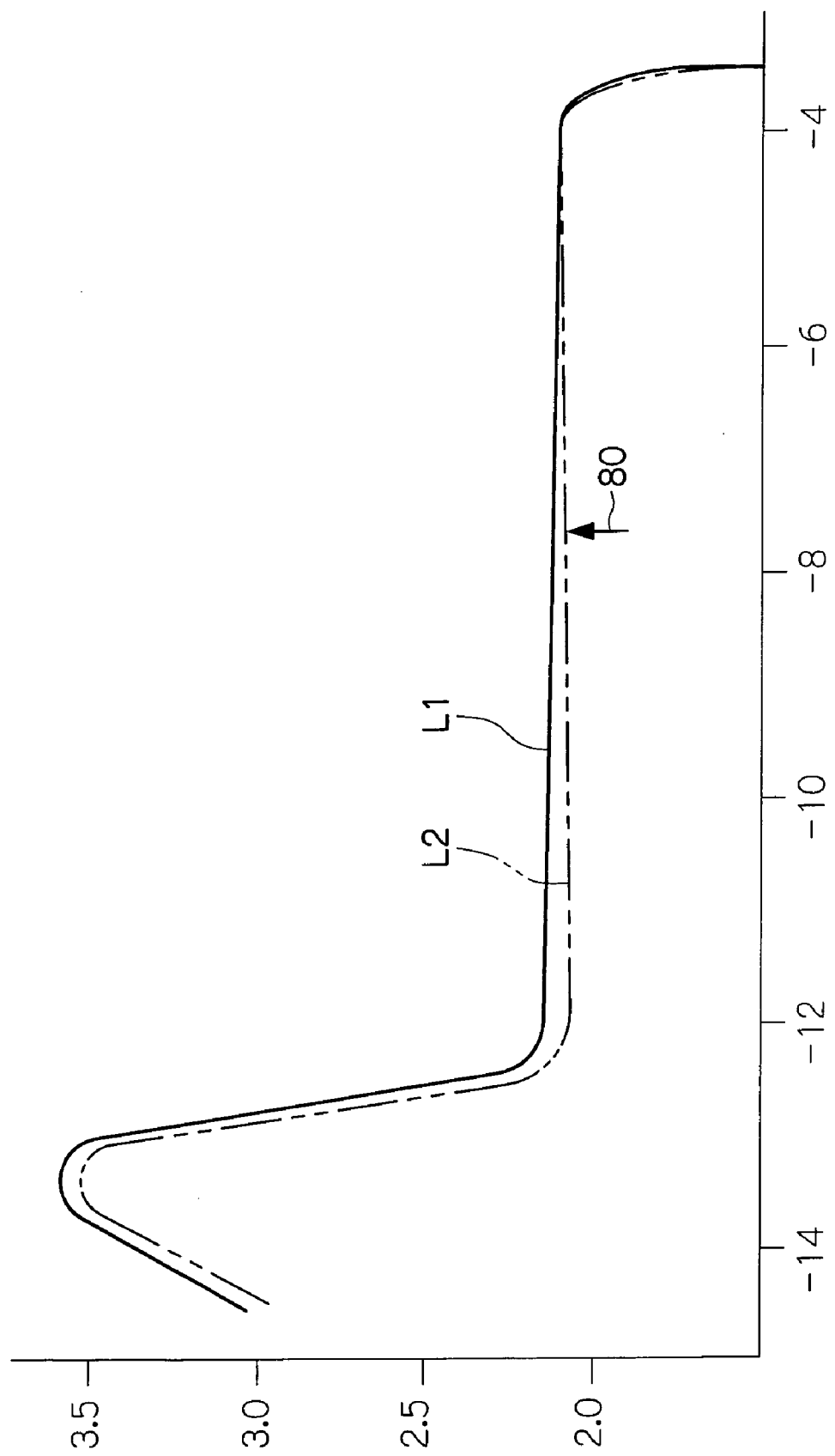
FIG. 6 is a graph showing deformation when the plate spring does not contact support point members during initial deformation.

As indicated by the two-dotted chain line L2 in FIG. 6, after the action portions 64 and 66 contact the support point members 80 due to this deformation, the support point members 80 serve as support points for the deformation of the action portions 64 and 66, but at this stage, the leading ends (pullout resistance force action portions) of the action portions 64 and 66 have already ended up moving toward the inner surface (attachment reference surface) of the side walls 22A and 32A. Thus, a sufficient pushing force (pullout resistance force) cannot be obtained.

If there is clearance between the action portions 64 and 66 and the support point members 80 when the plate spring 60 is attached to the case 12, the spring force drops and a sufficient pushing force (pullout resistance force) can no longer be obtained, either before or after the action portions 64 and 66 contact the support point members 80. However, in the present invention, this drawback does not arise.

In the present invention, the materials for the leader pin 50, the plate spring 60, and the case 12 are not particularly limited as long as the action demanded of each is exhibited. For example, it is preferable for the leader pin 50 to be made of metal, and particularly preferable for the leader pin 50 to be formed by cutting a stainless material (SUS 304).

It is also preferable for the plate spring 60 to be made of metal in view of the ease of molding and machining and obtaining a stable spring force. It is particularly preferable for the plate spring 60 to be formed by punching and then bending a stainless plate material (SUS 304; plate thickness of about 0.25 mm).

It is also preferable for the case 12 to be made of resin in view of the ease of molding and making the case lightweight. It is particularly preferable for the case 12 to be a resin-molded part using a polycarbonate resin.

What is claimed is:

1. A recording tape cartridge comprising:
    a case that rotatably houses a single reel onto which recording tape is wound;
    a leader member that is attached to an end portion of the recording tape and is pulled out by a pullout mechanism of a drive device;
    a spring member including an attachment portion that is attached to the case and pullout resistance force action portions that impart pullout resistance force to the leader member as a result of bending deformation; and support point members that contact the spring member between the attachment portion and the pullout resistance force action portions, wherein when D1 represents the height of the support point members measured from an attachment reference surface where the spring member is attached to the case, and D2 represents the height of the spring member in a natural state at the portions where the spring member contacts the support point members, the spring member is bent such that $D2 \leq D1$.

2. The recording tape cartridge of claim 1, wherein the spring member is made of metal.

3. The recording tape cartridge of claim 1, wherein the support point members are molded integrally with the case.

4. The recording tape cartridge of claim 1, wherein retention portions that retain the leader member are formed in the case, the retention portions include recessed surfaces, and the leader pin is urged toward the recessed surfaces by the spring member.

5. A recording tape cartridge comprising:

recording tape that includes an end portion to which a leader member is attached, with the recording tape being pulled out as a result of a pullout mechanism of a drive device engaging with the leader member;

a case that rotatably houses a single reel onto which the recording tape is wound;

retention portions that are formed inside the case and retain the leader member when the recording tape is housed inside the case with the leader member;

a spring member that is disposed inside the case and includes
   an attachment portion attached to an attachment surface formed in the case and
   pullout resistance force action portions that elastically deform when the leader member engaged by the pullout mechanism is pulled out from the retention portions and cause resistance force to act on the pulling out of the leader member; and support point members that contact the spring member at contact portions between the attachment portion and the pullout resistance force action portions and offer support points for the deformation of the spring member, wherein
the spring member includes bent portions between the contact portions and the attachment portion, and when D1 represents the height of the support point members measured from the attachment surface of the case, and D2 represents the height of the spring member at the portions where the spring member contacts the support point members in a state where the spring member has not been attached to the case, $D2 \leq D1$.

6. The recording tape cartridge of claim 5, wherein the spring member is made of metal.

7. The recording tape cartridge of claim 5, wherein the support point members are molded integrally with the case.

8. The recording tape cartridge of claim 5, wherein the retention portions include recessed surfaces, and the leader pin is urged toward the recessed surfaces by the spring member.

9. A recording tape cartridge comprising:

recording tape that includes an end portion to which a leader member is attached, with the recording tape being pulled out as a result of a pullout mechanism of a drive device engaging with the leader member;

a case that rotatably houses a single reel onto which the recording tape is wound;

retention portions that are formed inside the case and retain the leader member when the recording tape is housed inside the case with the leader member;

a spring member that is disposed inside the case and includes an attachment portion that is attached to the case and pullout resistance force action portions that elastically deform when the leader member engaged by the pullout mechanism is pulled out from the retention portions and cause resistance force to act on the pulling out of the leader member; and support point members that contact the spring member in a state where the leader member is housed in the retention portions and offer support points for the deformation of the spring member.

10. The recording tape cartridge of claim 9, wherein the spring member is made of metal.

11. The recording tape cartridge of claim 9, wherein the support point members are molded integrally with the case.

12. The recording tape cartridge of claim 9, wherein the retention portions include recessed surfaces, and the leader pin is urged toward the recessed surfaces by the spring member.

* * * * *